US012001950B2

(12) United States Patent
Zhang et al.

(10) Patent No.: US 12,001,950 B2
(45) Date of Patent: Jun. 4, 2024

(54) GENERATIVE ADVERSARIAL NETWORK BASED AUDIO RESTORATION

(71) Applicant: International Business Machines Corporation, Armonk, NY (US)

(72) Inventors: Yang Zhang, Cambridge, MA (US); Chuang Gan, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1484 days.

(21) Appl. No.: 16/299,828

(22) Filed: Mar. 12, 2019

(65) Prior Publication Data

US 2020/0293875 A1    Sep. 17, 2020

(51) Int. Cl.
*G06N 3/08* (2023.01)
*G06N 3/088* (2023.01)
*G10L 21/0208* (2013.01)

(52) U.S. Cl.
CPC .............. *G06N 3/08* (2013.01); *G06N 3/088* (2013.01); *G10L 21/0208* (2013.01)

(58) Field of Classification Search
CPC ........ G06N 3/08; G06N 3/088; G06N 3/0454; G06N 3/0472; G06N 3/0445; G10L 21/0208
See application file for complete search history.

(56) References Cited

U.S. PATENT DOCUMENTS 9,576,583 B1 * 2/2017 Betts ................... G10L 21/0232
9,620,105 B2 4/2017 Mason
10,068,557 B1 9/2018 Engel et al.
(Continued)

FOREIGN PATENT DOCUMENTS

CN    107945811 A    4/2018
CN    108877832 A    11/2018
CN    109119089 A    1/2019

OTHER PUBLICATIONS

Oyamada, Keisuke, et al. "Generative adversarial network-based approach to signal reconstruction from magnitude spectrogram." 2018 26th European Signal Processing Conference (EUSIPCO). IEEE, 2018. (Year: 2018).*

(Continued)

*Primary Examiner* — Viker A Lamardo
*Assistant Examiner* — Sidney Vincent Bostwick
(74) *Attorney, Agent, or Firm* — Stephen J. Walder, Jr.; Caleb Wilkes (57) ABSTRACT

Mechanisms are provided for implementing a generative adversarial network (GAN) based restoration system. A first neural network of a generator of the GAN based restoration system is trained to generate an artificial audio spectrogram having a target damage characteristic based on an input audio spectrogram and a target damage vector. An original audio recording spectrogram is input to the trained generator, where the original audio recording spectrogram corresponds to an original audio recording and an input target damage vector. The trained generator processes the original audio recording spectrogram to generate an artificial audio recording spectrogram having a level of damage corresponding to the input target damage vector. A spectrogram inversion module converts the artificial audio recording spectrogram to an artificial audio recording waveform output.

20 Claims, 4 Drawing Sheets

(56) References Cited

U.S. PATENT DOCUMENTS

| | | |
|---|---|---|
| 10,255,898 B1* | 4/2019 | Movshovitz-Attias ............... G11B 27/034 |
| 2018/0190249 A1 | 7/2018 | Roblek et al. |

OTHER PUBLICATIONS

Godsill, Simon J., and Peter JW Rayner. "Digital Audio Restoration—a statistical model based approach." (1998). (Year: 1998).*

Stallmann, Christoph F., and Andries P. Engelbrecht. "Gramophone noise detection and reconstruction using time delay artificial neural networks." IEEE Transactions on Systems, Man, and Cybernetics: Systems 47.6 (2016): 893-905. (Year: 2016).*

Boll, Steven F., "Suppression of Acoustic Noise in Speech Using Spectral Subtraction", IEEE Transactions on Acoustics, Speech, and Signal Processing, vol. ASSP-27, No. 2, Apr. 1979, 8 pages.

Canadas-Quesada, F.J. et al., "Constrained non-negative matrix factorization for score-informed piano music restoration", Digital Signal Processing 50 (2016) 240-257, Mar. 2016, 18 pages.

Canazza, Sergio et al., "Restoration of Audio Documents by Means of Extended Kalman Filter", IEEE Transactions on Audio, Speech, and Language Processing, vol. 18, No. 6, Aug. 2010, 9 pages.

Cappe, Olivier, "Enhancement of musical signals degraded by background noise, using long-term behavior of the short-term spectral components", International Conference on Acoustics, Speech and Signal Processing, ICASSP, Minneapolis, USA, Apr. 27-30, 1993, 4 pages.

Godsill, Simon J. et al., "A Bayesian Approach to the Restoration of Degraded Audio Signals", IEEE Transactions on Speech and Audio Processing, vol. 3, No. 4, Jul. 1995, 12 pages.

Godsill, Simon J. et al., "Robust Noise Modelling with Application to Audio Restoration", Applications of Signal Processing to Audio and Acoustics, 1995, IEEE ASSP Workshop on. IEEE, Oct. 15-18, 1995, 4 pages.

Parras-Moral, J. et al., "Audio restoration of solo guitar excerpts using a excitation-filter instrument model", Stockholm Music Acoustics Conference Jointly with Sound and Music Computing Conference, Stockholm, Sweden, Jul. 30-Aug. 3, 2013, 6 pages.

Vaseghi, S. V. et al., "Restoration of Old Gramophone Recordings", J. Audio Eng. Soc., vol. 40, No. 10, Oct. 1992, 6 pages.

Anonymous, "Removing Breathing Artifacts from Audio", IP.com, Prior Art Database Technical Disclosure, IPCOM No. IPCOM000252006D, Dec. 13, 2017, 33 pages.

Cabras, Giuseppe et al., "The Restoration of Single Channel Audio Recordings Based on Non-Negative Matrix Factorization and Perceptual Suppression Rule", Proceedings of the 13th International Conference on Digital Audio Effects (DAFx-10), Sep. 6-10, 2010, 9 pages.

Dieleman, Sander et al., "The challenge of realistic music generation: modeling raw audio at scale", 32nd Conference on Neural Information Processing Systems (NeurIPS 2018), Dec. 2-8, 2018, 11 pages.

Engel, Jesse et al., "Neural Audio Synthesis of Musical Notes with WaveNet Autoencoders", Cornell University, arXiv.org, arXiv:1704.01279v1 [cs.LG], Apr. 5, 2017, 16 pages.

Esquef, Paulo A. et al., "Restoration and Enhancement of Solo Guitar Recordings Based on Sound Source Modeling", Audio Engineering Society, Inc., vol. 50, No. 4, Apr. 2002, 10 pages.

Gao, Yang et al., "Voice Impersonation Using Generative Adversarial Networks", submitted version from arXiv: 1802.06840v1 [cs.SD] Feb. 19, 2018, 5 pages.

Godsill, Simon J. et al., "Statistical Model-Based Approaches to Audio Restoration and Analysis", Journal of New Music Research 2001, vol. 30, No. 4, Nov. 2001, 17 pages.

Kameoka, Hirokazu et al., "StarGAN-VC: Non-Parallel Many-to-Many Voice Conversion with Star Generative Adversarial Networks", 2018 IEEE International Conference on Acoustics, Speech and Signal Processing (ICASSP), Apr. 15-20, 2018, submitted version from arXiv: 1806.02169v2 [cs.CD] Jun. 29, 2018, 9 pages.

Konwer, Aishik et al., "Staff line Removal using Generative Adversarial Networks", 24th International Conference on Pattern Recognition (ICOR 2018), Sep. 2018, 6 pages.

Osipenko, Alexander, "Music Generation with Neural Networks-GAN of the Week", Cindicator, Aug. 22, 2018, 4 pages.

Perraudin, Nathanael et al., "A Fast Griffin-Lim Algorithm", 2013 IEEE Workshop on Applications of Signal Processing to Audio and Acoustics, Oct. 20-23, 2013, 4 pages.

Wan, Li et al., "Generalized End-to-End Loss for Speaker Verification", 2018 IEEE International Conference on Acoustics, Speech and Signal Processing (ICASSP), Apr. 15-20, 2018, submitted version from arXiv: 1710.10467v4 [eess.AS] Jan. 24, 2019, 5 pages.

* cited by examiner

GENERATIVE ADVERSARIAL NETWORK BASED AUDIO RESTORATION

BACKGROUND

The present application relates generally to an improved data processing apparatus and method and more specifically to mechanisms for performing audio restoration using generative adversarial networks.

Generative models learn a joint probability distribution p(x, y) of input variables x (the observed data values) and output variables y (determined values). Most unsupervised generative models, such as Boltzmann Machines, Deep Belief Networks, and the like, require complex samplers to train the generative model. However, the recently proposed technique of Generative Adversarial Networks (GANs) repurposes the min/max paradigm from game theory to generate images in an unsupervised manner. The GAN framework comprises a generator and a discriminator, where the generator acts as an adversary and tries to fool the discriminator by producing synthetic images based on a noise input, and the discriminator tries to differentiate synthetic images from true images.

Generative adversarial networks (GANs) have primarily been applied to textual and image processing applications. However, recently, GANs has also been used to generate new music compositions from apparent nothingness, with limited success (see Alexander Osipenko, "Music Generation with Neural Networks-GAN of the Week," Aug. 22, 2018, Cindicator website).

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system, comprising a processor and a memory, the memory comprising instructions which are executed by the processor to specifically configure the processor to implement a generative adversarial network (GAN) based restoration system. The method comprises training, by the GAN based restoration system, a first neural network of a generator of the GAN based restoration system, to generate an artificial audio spectrogram having a target damage characteristic based on an input audio spectrogram and a target damage vector, thereby generating a trained generator. The method further comprises inputting, by the GAN based restoration system to the trained generator, an original audio recording spectrogram corresponding to an original audio recording and an input target damage vector. The method also comprises processing, by the trained generator, the original audio recording spectrogram to generate an artificial audio recording spectrogram having a level of damage corresponding to the input target damage vector. Moreover, the method comprises converting, by a spectrogram inversion module of the GAN based restoration system, the artificial audio recording spectrogram to an artificial audio recording waveform output.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Before the invention of digital storage, music and other audio was recorded on an analog audio storage physical medium, referred to as a phonograph record or simply "record," which has the form of a flat disc with an inscribed, modulated spiral groove. The groove usually begins near the periphery of the disc and ends near the center of the disc. These discs were commonly manufactured using a polyvinyl chloride material and thus, are often referred to as vinyl records or simply "vinyl." Because this was a widely used and predominant medium of the pre-digital age, many older pieces of music and sound recordings have been preserved on such media. However, due to the fact that the music/audio is recorded in an analog manner physically onto the surface of the medium using inscribed, modulated grooves, many of the older records suffer from substantial groove damage and contamination, which significantly impacts music/sound quality.

Music/sound (hereafter assumed to be "music" for purposes of illustration) restoration technologies aim to recover the recorded music to the best of its quality. Existing music restoration technologies include physical restoration of the record itself, and some digital restoration mechanisms. Physical restoration recovers the grooves by removing dirt and other contaminants physically present on the record and in the grooves. While this helps with issues of contamination by removing the dirt and debris, physical restoration does not fully remedy damage done to the grooves themselves. Digital restoration recovers the music by removing clicks and humming noise from the music by using digital interpolation methods and clean samples. While digital restoration technologies do a reasonably good job of restoring music on records that have very minor damage to physical grooves, digital restoration technologies are unable to deal with more heavily damaged or worn records, as such damage or wear results in substantially more than mere clicks and humming noise in the music/sound.

Minor damages refer to damages that are sporadic and do not result in significant content loss. For example, clicks are very short in time, so it would only affect the recording within that short time frame, if at all. Humming is highly concentrated in frequency, so it would only affect the recording at that specific frequency. On the other hand, major damages are wide spread and result in significant content loss. For example, bandwidth loss which refers to the loss of the information in an extensive frequency band.

The illustrative embodiments address the limitations of restoration methodologies by providing a new restoration mechanism based on deep learning computing models, such as recurrent neural networks (RNNs) and generative adversarial networks (GANs). One way in which deep learning computing models may be utilized to assist with restoration of music/sound recordings is to learn mappings of audio features from noisy music/sound recordings to clean music/sound recordings (again, assumed to be music hereafter but intended to be inclusive of any sound or audio recording). While such a solution may be useful, it would require many noisy and clean music pairs, which is difficult to obtain because many older recordings are damaged and cannot be classified as "clean" music such that there are no "clean" music versions to pair with the corresponding noisy music version. It should be appreciated that "damage" refers to audio imperfections due to physical alterations or marring, i.e. physical damage, to the physical medium on which the original audio recording is recorded such that a "clean" music recording is one where there is no imperfection due to such damage, and a heavily damaged music recording is one that has more than a predetermined amount of imperfections due to physical alternations/marring of the physical medium.

The illustrative embodiments provide a music restoration mechanism based on such artificial intelligence mechanisms as GANs and RNNs which does not require corresponding pairs of damaged and clean music pairs. To the contrary, the illustrative embodiments only require portions of music of a same genre and utilize a GAN mechanisms, incorporating RNNs, to convert damaged music to a music recording that belongs to a sample space of high quality music.

The mechanisms of the illustrative embodiments comprise three primary modules: the pre-processing module, the GAN module, and a spectrogram inversion module. The pre-processing module comprises logic that operates to convert an input music waveform into a spectrogram, i.e. a visual representation of a spectrum of the input music waveform. In one illustrative embodiment, the pre-processing module utilizes a short-time Fourier transform on frames with frame length L and frame shift H. The phase of the resulting spectrum (which comprises the time and frequency dimension) is removed and the spectrogram is divided into segments with the same number of frames in each segment. A frame refers to a collection of consecutive audio samples, each sample being a point in time of the audio waveform. The frame length is the number of samples in the frame. The frame shift is the number of samples between the starts of two consecutive frames. For example, if the frame length is 100 and the frame shift is 20, then the first frame includes samples 1 to 100, the second frame includes samples 21 to 120, and the third frame includes samples 41 to 140.

The GAN module comprises logic, including a generator and a discriminator implemented as neural network computing models, such as RNNs, which operate to take the spectrogram of degraded music as input, and outputs a spectrogram of restored music. In addition to the generator and the discriminator, the GAN module includes a damage encoding network to encode the degree of damage of the input music. The damage encoding network maps the input spectrogram to a vector encoding the damage information, referred to as the "damage vector." In one illustrative embodiment, the damage encoding network architecture comprises a stack of long short term memory (LSTM) cells or LSTM layers on a frame level. The output of a last LSTM cell of a last frame is processed into a damage code (vector) or damage degree label (vector of length 1—scalar damage label) which can be proxied by the date of the input music recording. That is, since a ground truth for damaged music is generally not available for the reasons noted previously, the year of a recording may be used to provide a proxy for the ground truth during training.

The generator is conditioned on the damage code, or damage degree label (hereafter referred to interchangeably as the "damage code") to generate clean/damaged music instead of on a categorical domain vector as the degree of damage is not considered categorical but rather is considered to be a continuum. The generator generates a "fake" or "artificial" spectrogram given the input spectrogram (from the pre-processing module) and the damage vector as input. The generated spectrogram should match the degree of damage specified in the damage vector generated by the damage encoding network, while retaining the musical content in the input music spectrogram, e.g., if the damage vector is generated from clean and high quality music input, the fake spectrogram should be clean and of high quality as well. The goal of the discriminator of the GAN architecture is to determine the artificial or "fake" spectrogram from the true spectrogram, given the artificial spectrogram generated by the generator and the true spectrogram of the input music.

The generator and discriminator are trained such that the generator is able to generate an artificial spectrogram that fools the discriminator into determining that the artificial spectrogram is a true spectrogram. As a result, the generator is able to generate artificial music spectrograms that have a desired level of "damage" specified by the damage vector that the discriminator regards as true music spectrograms. Thereafter, the generator may be given a target damage vector representing high quality music, and an input music spectrogram from damaged music as an input, and generate an artificial music spectrogram that is a high quality version of the input damaged music spectrogram. In this way, the generator generates a restored version of the input damaged music spectrogram having high quality that fools the discriminator into regarding the restored version of the input damaged music spectrogram as a true input music spectrogram.

The spectrogram inversion module converts the spectrogram of the restored music to a music waveform. In one illustrative embodiment, the spectrogram inversion module utilizes a Griffin-Lim algorithm, such as described in Perraudin et al., "A Fast Griffin-Lim Algorithm," Applications of Signal Processing to Audio and Acoustics (WASPAA), 2013 IEEE Workshop on. IEEE, 2013. The resulting music waveform may be stored as a data structure for later use, provided to an audio output device to output audio for detection by the human ear or other audio detection device, or the like.

Thus, the mechanisms of the illustrative embodiments provide an artificial intelligence mechanism for restoring music recordings to a high quality state even in the event that clean music versions are not available for training the artificial intelligence mechanisms. Moreover, the mechanisms of the illustrative embodiments do not rely on physical restorations or digital restorations that are limited to interpolating from clean samples. The mechanisms of the illustrative embodiments provide a GAN based mechanism for learning how to restore damaged music recordings into a clean or high quality version of the music recording in which the damage aspects are removed or at least minimized, and the underlying clean music features are more prominent.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
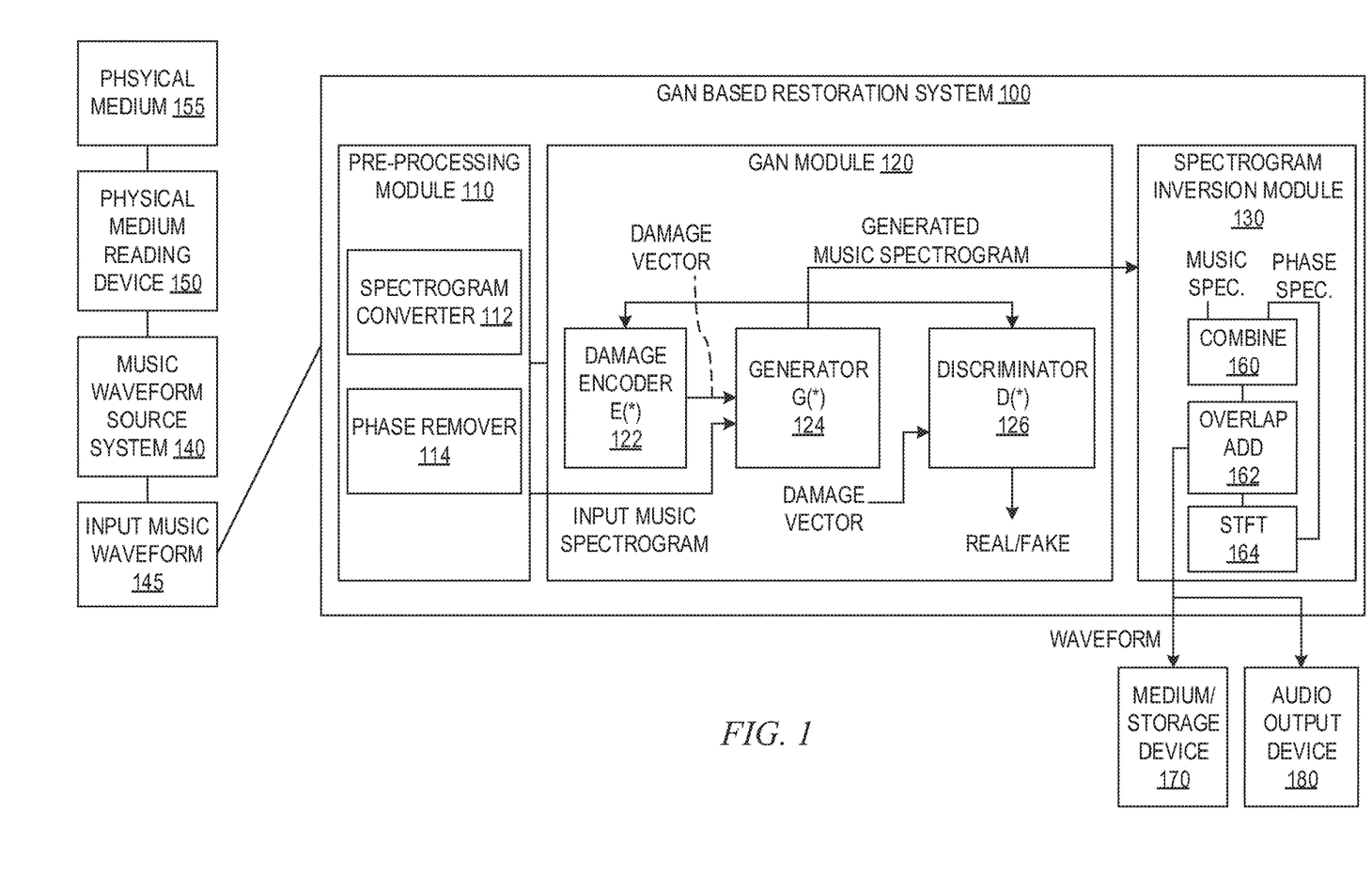
FIG. 1 is an example block diagram of the primary operational elements of a generative adversarial network (GAN) based restoration system for audio recording restoration in accordance with one illustrative embodiment.

FIG. 1 is an example block diagram of the primary operational elements of a generative adversarial network (GAN) based restoration system for audio recording restoration in accordance with one illustrative embodiment. Again, music restoration will be the focus of the description of the illustrative embodiments, but the present invention is not limited to such and can operate on any audio or sound recording which suffers from the damage or degradation mentioned above and would be targeted for restoration. As such, FIG. 1 illustrates that the GAN based restoration system 100 receives an input music waveform 145 from a music waveform source system 140. The music waveform source system 140 may be any system that is capable of providing an audio waveform in a digital format to the GAN based restoration system 100. In some embodiments, this music waveform source system 140 is a computing system that is coupled to a physical medium reading device 150 that performs an analog reading operation of a music recording on a physical medium 155, such as a vinyl record or the like. The analog reading operation converts the music/sound recording on the physical medium 155 to an analog signal which is then converted to a digital format by the music waveform source system 140. The music waveform is then transmitted to the GAN based restoration system 100 as digital data for processing.

As shown in FIG. 1, the GAN based restoration system 100 comprises the three primary modules of the pre-processing module 110, the GAN module 120, and the spectrogram inversion module 130. The pre-processing module comprises a spectrogram converter 112 that receives an input music waveform and converts the input music waveform to music spectrogram output. The spectrogram converter 112, in one illustrative embodiment, utilizes a short-time Fourier transform (STFT) on frames with frame length L and frame shift H, as mentioned previously. STFT is a Fourier-related transform used to determine the sinusoidal frequency and phase content of local sections of a signal as it changes over time. In practice, the procedure for computing STFTs is to divide a longer time signal into shorter segments of equal length, referred to herein as frames, and then compute the Fourier transform separately on each shorter segment or frame. This reveals the Fourier spectrum on each frame.

A phase remover 114 removes the phase of the resulting music spectrogram output and divides the music spectrogram output into segments with the same number of frames in each segment. Phase removal is a standard practice in audio processing. After a signal is converted to the frequency domain, i.e. the spectrums, there are two parts: the phase and the amplitude. The phase characterizes the delay of each frequency component. The amplitude characterizes the energy of each frequency component. The phase information is notoriously hard to process by machine learning systems and most of the useful information is in the amplitude, therefore phase is usually discarded. The resulting spectrogram is a visual representation of a spectrum of frequencies of the music signal(s) as they vary with time, segmented into segments with equal number of frames.

The GAN module 120 comprises a damage encoder 122, a generator 124 and a discriminator 126, where the generator and discriminator are implemented as neural network computing models, such as recurrent neural networks (RNNs), which operate to take the input music spectrogram of degraded music as input, and outputs a spectrogram of restored music. The damage encoder 122 operates such that, given any input music spectrogram, whether associated with poor quality music, e.g., highly damaged music recordings, or high quality music, e.g., clean or low damage music recordings, the amount of damage in the music may be characterized by a damage vector.

The damage encoder 122 may be implemented as a neural network, such as a RNN with long short term memory (LSTM) cells that operate on the spectrogram output by the pre-processing module 110 and only the output of the last time step processed by the LSTM cells is kept. The fact that only the last time step processed by the LSTM cells is kept is because the input to the LSTM cells is a time series, and so is the output. Namely the LSTM cells output a vector at each single time step. For example, if the input much has T frames, the LSTM will output T vectors. However, only one vector is needed to summarize the entire music. Fortunately, LSTM has a nice memory of the past. That means that the output at a certain time step would include information of the past time steps. With that in mind, the output at the last time step would summarize all of the information of the entire input music. Therefore, the output of the last time step is selected as the single vector summarizing all the information of the input music spectrogram. Thus, the RNN of the damage encoder 122 operates on a time dimension where at each time step there is a vector representation of sound frequency at that time step, and the last time step is provided to a fully connected layer which outputs a damage vector characterizing the damage present in the input music spectrogram.

In one illustrative, the RNN architecture, training, and operation of the damage encoder 122 is similar to that described in Wan et al., "Generalized End-to-End Loss for Speaker Verification," 2018 IEEE International Conference on Acoustics, Speech, and Signal Processing (ICASSP), IEEE, 2018, hereby incorporated by reference, comprising a stack of LSTM cells, or LSTM layers, on a frame level, i.e. the temporal resolution of the LSTM is the frame rate. The RNN architecture, training, and operation described in Wan et al., is modified by the illustrative embodiments in three major ways. In a first modification, rather than operating based on a speaker label, the damage encoder 122 of the illustrative embodiments operates on a damage degree label (for scalar values, i.e. 1-value vectors) or damage level code (for greater than 1 value vectors). In a second modification, rather than randomly sampling a number of speakers in each batch, as is done in Wan et al., the damage encoder 122 of the illustrative embodiments includes all damage classes in a single batch. In a third modification, loss function of Wan et al. maximizes the intra-class similarity and minimizes the inter-class similarity. The damage encoder 122 of the illustrative embodiments instead adds a weighting to the inter-class similarity so that the damage classes that are far apart (the production years are far apart) are assigned higher weights. In this way, the damage encoder 122 will focus on minimizing the inter-class similarity between more distant damage classes.

Thus, as mentioned above, the damage encoder 122 operates on a damage degree label (scalar) or code (vector), rather than a speaker label as described in Wan et al. The damage degree label or code is proxied by a date of the input music recording, i.e. a date label l*. That is, a period of time of music recordings may be established, e.g., the year 1900 to the year 2000 divided into classes having corresponding date labels l* corresponding to decades, e.g., 1900 to 1909, 1910 to 1919, etc. The date labels are generated such that the similarity of the damage vectors corresponding to the dates within the period of time is maximized while the similarity with different date label classes is minimized.

The features extracted from frames of the input music spectrogram are fed into the RNN frame by frame. A linear layer, or full connect layer, is connected to the last LSTM layer as an additional transformation of the last frame response of the RNN. The embedding vector is defined as the L2 normalization of the network output, and the similarity matrix S(x,l) is defined as the scaled cosine similarities between each embedding vector to all centroids of the classes or date ranges, represented by date labels l*, of the input music recordings. S(x,l) is defined as:

$$S(x,l) = w \cos(E(x), \mathbb{E}_{y:l^*(y)=l}[E(y)])b, \quad (1)$$

where x is a damage code, l* is the year classification, E(x) is an output of the damage encoder 122, E(y) is the output of the damage encoder of the other audio belonging to the class l, $\mathbb{E}$ denotes taking an average over all the damage vectors belonging to class l, w and b are trainable weight parameters which are determined by minimizing cross entropy loss. Thus, the equation (1) above is calculating the damage vector of x to the centroid of the lth class, where the centroid means the average value of all the damage vectors that belong to the lth class.

During training it is desired that the embeddings of each input music spectrogram be similar to a centroid of music recordings of that time period corresponding to the date label l* of the input music spectrogram, while at the same time, far from other time periods. The loss function pushes the embedding vector close to the centroid of the particular time period class and pulls away from all other centroids of all other time period classes. A cross-entropy loss is utilized on [S(x,0), S(x,1), . . . ] with a true target label l*(x). Thus, by training the RNN by making modifications to the operational parameters to thereby increase the similarity S(x,l) of the input music spectrogram with regard to the centroid of the time period classification, and reducing the similarity of the input music spectrogram with regard to the centroid of other time period classifications, the RNN is trained to characterize the damage of music recordings and generate a corresponding damage vector output. In other words, the mechanisms of the illustrative embodiments generate characteristics of music in different time frames and assume that all music of that time frame have similar levels of physical damage to their recordings. Then this assumption is used to represent the damage characteristics, or damage embeddings, for a particular audio recording corresponding to the date label l* corresponding to the audio recording.

The damage encoder 122 maintains the vector for the last time step generated by the LSTMs of the RNN, for the reasons previously noted above, and generates a damage vector based on this last time step vector via the full connect layer. That is, the output of the last time step represents the damage vector and the full connect layer outputs the damage vector based on the damage represented in the last time step output. The damage vector, also referred to as the damage embedding, is output by the damage encoder 122 to the generator 124 of the GAN module 120 which also receives the input music spectrogram from the pre-processor module 110.

The generator 124 generates an artificial or "fake" music spectrogram given the input music spectrogram from the pre-processing module 110 and the damage vector from the damage encoder 122 as input. The generated spectrogram approximates the degree of damage specified in the damage vector generated by the damage encoder 122, while retaining the musical content in the input music spectrogram, e.g., if the damage vector is generated from clean and high quality music input, the artificial spectrogram is clean and of high quality as well, i.e. having a relatively small number of errors in music output, i.e. having a similar quality to the latest recordings, e.g., produced after the year 2000. Thus, for example, given an input music spectrogram and a damage vector characterizing damage to music recordings from the years 1920 to 1929, the generator 124 is trained to generate and output a music spectrogram comprising the musical content of the input music spectrogram, but with damage characteristics that cause the output music spectrogram to appear to be a music recording from the years 1920 to 1929, i.e. having the amount of damage to the quality of the music that makes it appear to be from a recording that was made in the years 1920 to 1929.

The generator 124 may be implemented as a neural network computing model, such as an RNN or the like. The generator 124 copies and applies the damage vector to each of the input features of the input music spectrum, e.g., concatenates the damage vector to the input spectrogram, and processes the modified input music spectrogram through the neural network computing model to generate an artificial music spectrum approximating a real or authentic damaged music spectrogram corresponding to the damage vector. It should be appreciated that once trained, the generator 124 may be used to generate an artificial music spectrogram having any desired damage. A goal is to have the generator 124 take a damaged input music spectrogram and generate a clean or undamaged music spectrogram as an output and thus, the damage vector may be eliminated or set to have values indicative of a clean or undamaged music output. However, the generator 124 can also be used to approximate damage from various time periods, e.g., if one wishes to emulate music quality from a certain time period, one can set the damage vector to have values representing damage characteristics from that time period using the damage encoder mechanism, for example.

The training of the generator 124 to generate such a damaged music spectrogram involves using the discriminator 126 in an adversarial relationship attempting to recognize or classify the output generated by the generator 124 and an actual input music spectrum properly into a "artificial" or genuine class, also referred to as "fake" and "true" classes. That is, the goal of the discriminator 126 of the GAN architecture 120 is to determine the artificial music spectrogram generated by the generator 124 from the true music spectrogram that is the music spectrogram generated by the pre-processor module 110. The discriminator 126 is similar in configuration to that of the damage encoder 122 in that it comprises a neural network computing model, such as an RNN, but instead of outputting a damage vector, the discriminator 126 is configured to output a classification of the input music spectrogram as being either "artificial" (generated by the generator 124) or "real" (true input music spectrogram provided by the pre-processor module 110). The discriminator 126 concatenates the damage vector generated by the damage encoder 122 to the input music spectrogram from the pre-processing module 110 in a similar manner to that of the generator 124. The discriminator 126 processes the concatenated input through an RNN similar to that of the damage encoder 122 and maintains only the last time step output of the LSTMs of the RNN which is provided to the fully connected layer that outputs a classification of "artificial" or "real".

The generator 124 and discriminator 126 are trained through an iterative machine learning process which involves minimizing losses defined for the neural network models of the generator 124 and discriminator 126. For the generator 124, an adversarial loss, damage loss, identity loss, and cycle loss are the primary loss functions that are minimized through a machine learning process. These generator 124 losses, in one illustrative embodiment, are defined using the following relationships:

$$\text{Adversarial Loss: } \mathbb{E}_{x,y}[-\log[1-D(G(x,E(y)),E(y))]] \quad (2)$$

$$\text{Damage Loss: } \mathbb{E}_{x,y}[\|E(G(x,E(y)))-E(y)\|_2^2] \quad (3)$$

$$\text{Identity Loss: } \mathbb{E}_x[\|G(x,E(x))-x\|_2^2] \quad (4)$$

$$\text{Cycle Loss: } \mathbb{E}_{x,y}[\|G(G(x,E(y)),E(x))-x\|_2^2] \quad (5)$$

where $D(*)$ is the discriminator output, $G(*)$ is the generator output, and $E(*)$ is the damage encoder embedding, again where the double E represents an average, and x and y represent two different pieces of input audio or music. The adversarial loss represents the degree to which the discriminator can recognize the generated output as artificial (or "fake"). The damage loss represents how well the damage code of the generated output matches the target damage code. The identity loss represents the self-to-self conversion to self. The cycle loss represents the self-to-other-to-self conversion to self. That is, identity loss stipulates that if a portion of audio or music of a certain damage degree, e.g., clean, is to be converted to the same damage degree, it should be unaltered (because it is converting to the damage degree of itself). Cycle consistency loss stipulates that if a portion of audio or music of a certain damage degree is converted to a different damage degree, but then converted again back to its own damage degree, then it should be unaltered.

With regard to the discriminator 126, in one illustrative embodiment, the discriminator 126 utilizes a single loss to govern its machine learning. In one illustrative embodiment, this loss is an adversarial loss defined using the following relationship:

$$\text{Adversarial Loss: } \mathbb{E}_{x,y}[\log[D(x,E(x))]+\log[1-D(G(x,E(y)),E(y))]] \quad (6)$$

where the adversarial loss of the discriminator is the degree to which the discriminator can correctly recognize the input audio spectrogram provided to the discriminator as artificial (or "fake").

When training the discriminator 126, real and artificial (or "fake") spectrograms come with genuine or true labels alleging that they are genuine or true spectrograms. The discriminator 126 is informed as to which spectrograms are indeed real and which are artificial or "fake," so that the discriminator 126 can learn to distinguish the two. Formally, the discriminator updates its parameters to minimize equation (6) using a gradient descent algorithm. When training the generator 124, the discriminator 126 is fixed. Only the generator 124 parameters are updated to minimize the weighted combination of equations (2) and (4) using a gradient descent algorithm. The discriminator 126 and generator 124 alternately takes a gradient descent step, as if they were fighting against each other. The gradient descent step length is preset and tuned. The iteration goes on and on until the loss change falls below a preset amount.

In this way, the generator 124 and discriminator 126 are trained such that the generator 124 is able to generate an artificial music spectrogram that fools the discriminator 126 into determining that the artificial music spectrogram is a genuine or true music spectrogram. As a result, the generator 124 is able to generate artificial music spectrograms that have a desired level of "damage" specified by the damage vector that the discriminator 126 regards as true music spectrograms. Thereafter, the generator 124 may be given a target damage vector representing high quality music, and an input music spectrogram from damaged music as an input, and generate an artificial music spectrogram that is a high quality version of the input damaged music spectrogram. In this way, the generator 124 generates a restored version of the input damaged music spectrogram having high quality that fools the discriminator 126 into regarding the restored version of the input damaged music spectrogram as a true input music spectrogram.

The spectrogram inversion module 130, also referred to as a phase reconstruction module, converts the music spectrogram generated by the generator 124 of the GAN module 120 to a music waveform. Recall that the phase of the input music waveform was removed by the phase remover 114 of the pre-processing module 110. The spectrogram inversion module 130 operates to insert a phase back into the generated music spectrogram to thereby convert the spectrogram to a music waveform data structure that may be stored as a restored music waveform data structure on a medium/storage device 170, and used to generate an audio output by an audio output device 180 (e.g., speaker device or the like), perceivable by the human ear or other audio detection device.

In one illustrative embodiment, the spectrogram inversion module 130, or phase reconstruction module, uses a Griffin-Lim algorithm, such as described in Perraudin et al., "A Fast Griffin-Lim Algorithm," Applications of Signal Processing to Audio and Acoustics (WASPAA), 2013 IEEE Workshop on. IEEE, 2013, to introduce a phase into the music spectrogram. As shown in FIG. 1, the spectrogram inversion module 130 receives the music spectrogram as an input and processes the music spectrogram through combine logic 160, overlap add logic 162, and short-time Fourier transform (STFT) logic 164. The combine logic 160 combines the magnitudes specified in the input music spectrogram with a phase spectrogram generated by the STFT logic 164. The overlap add logic 162 applies an overlap add methodology, known in signal processing, to the combination of the music spectrogram and the phase spectrogram to generate an audio waveform.

Thus, if the phase spectrogram is available, the combine logic 160 provides a complex spectrogram (magnitude and phase) which is able to be converted back to a waveform by overlap add operations performed by the overlap add logic 162. The waveform can be converted to a complex spectrogram using short-time Fourier transform (STFT). If the phase spectrogram is correct, then it will be consistent after the two transforms. This means that if the overlap add logic 162 performs overlap add followed by STFT performed by the STFT logic 164, the resulting phase spectrogram will be exactly the same. If the phase spectrum is not correct, it will not remain consistent. So, the basic idea of the Griffin-Lim algorithm is to start with a random guess of the phase spectrogram, and alternately perform overlap add and STFT until the phase spectrograms converge.

The resulting audio waveform, or music waveform, generated by the spectrogram inversion module 130 is a data structure providing a digital representation of an audio output. This music waveform data structure may be stored on a medium, such as a compact disc, or in a storage device, such as a memory, a hard disk, cloud storage, or any other medium/storage device capable of storing a data structure for later use. The stored music waveform data structure may then be later used to output the corresponding music in a digital or analog manner, as is generally known in the art.

Thus, with the mechanisms of the illustrative embodiments, a user may submit an input music waveform from an actual music recording, such as by using a computing device or the like coupled to an analog reader that plays or otherwise detects the music recording from the medium, e.g., a record player configured to provide analog signals to a computing device that converts analog signals to digital representations. This input music waveform may have any level of damage represented in the digital representation corresponding to the amount of physical damage present on the medium on which the music is recorded, e.g., physical damage to the grooves of a vinyl record. Given this damaged input music waveform, the mechanisms of the illustrative embodiments convert this damaged input music waveform to a music spectrogram which is then processed via the generator 124 of the GAN module 120, to generate an artificial music spectrogram in which the original music, without the previously present damage being present, or with the previously present damage being minimized. The generated or artificial music spectrogram is then converted back into a music waveform where the resulting music waveform does not include the damage present in the input music waveform, or has this damage significantly reduced. As a result, the original music is restored even in the presence of significant physical damage to the medium on which the music was recorded.

Figure 2:
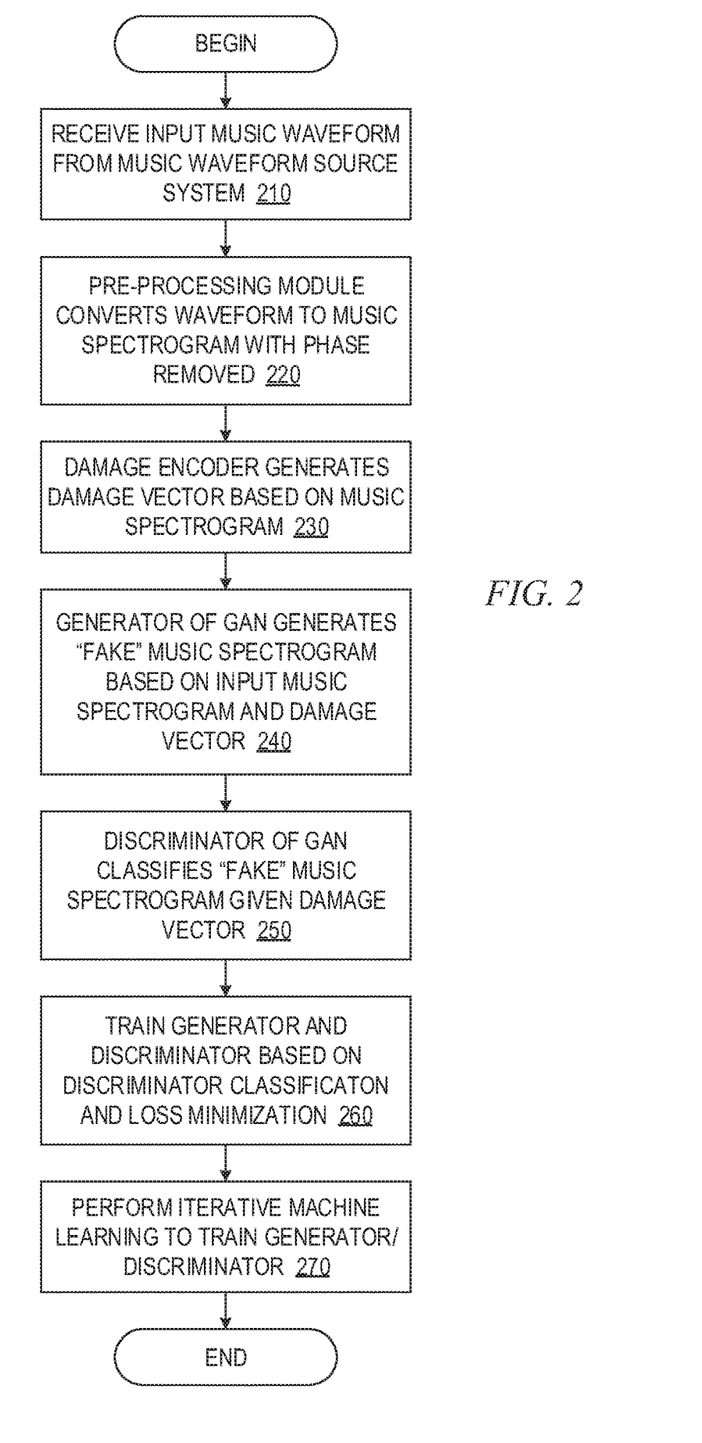
FIG. 2 is a flowchart outlining an example operation for training a GAN based restoration system in accordance with one illustrative embodiment.

FIG. 2 is a flowchart outlining an example operation for training a GAN based restoration system in accordance with one illustrative embodiment. As shown in FIG. 2, the operation starts by receiving an input music waveform from a music waveform source system (step 210). The input music waveform, during a training operation, may be one of a plurality of training input music waveforms in which aspects of the input music waveform may be known as a ground truth set of features about the input music waveform, such as the date of the recording of the music. A pre-processing module receives the input music waveform and converts the input music waveform to a music spectrogram output with the phase having been removed (step 220). A damage encoder operates on the input music spectrogram generated by the pre-processing module to generate a damage vector, or damage embedding, that characterizes the amount of damage in the input music waveform (step 230). It is assumed for purposes of the outline in FIG. 2 that the damage encoder has already been trained in a manner such as described previously so that the damage encoder correctly identifies damage vectors based on the date label or time periods associated with music recordings.

The damage vector is provided along with the input music spectrogram to a generator of a GAN as input which operates on the combination of damage vector and the input music spectrogram to generate a fake music spectrogram output (step 240). The artificial or generated music spectrogram is provided as input to a discriminator of the GAN which operates on the generated music spectrogram to attempt to properly classify the input as either a real or artificial music spectrogram given the damage vector (step 250). Based on the correctness/incorrectness of the discriminator classification, the discriminator and generator of the GAN are trained through a machine learning operation to minimize losses in the generator and discriminator (step 260). This process may be an iterative machine learning process based on the same or different input music waveforms until the losses associated with the generator and discriminator are minimized to a predetermined level or fail to achieve more than a predetermined amount of change from one iteration to another (step 270). The resulting trained generator thus, is able to generate an artificial music spectrogram output that fools the discriminator into thinking the artificial music spectrogram is a true music spectrogram output. The operation then terminates.

Figure 3:
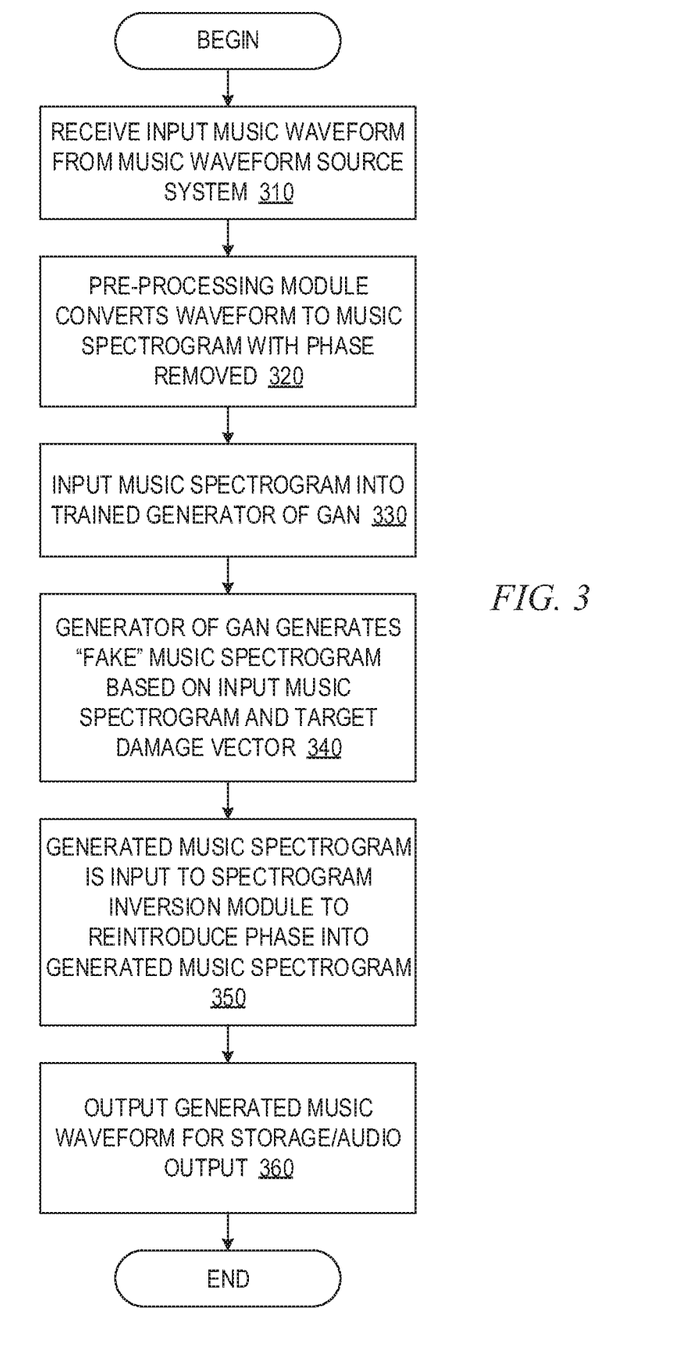
FIG. 3 is a flowchart outlining an example operation of a GAN based restoration system in accordance with one illustrative embodiment.

FIG. 3 is a flowchart outlining an example operation of a GAN based restoration system in accordance with one illustrative embodiment. The outline shown in FIG. 3 assumes that the generator of the GAN has been trained through a process such as outlined above such that it is configured to generate an artificial music spectrogram given a damage vector and input music spectrogram.

As shown in FIG. 3, the operation starts by receiving an input music waveform from a music waveform source system (step 310). The input music waveform is converted by a pre-processing module to an input music spectrogram (step 320) which is input to the trained generator of the GAN based restoration system along with a target damage vector, or target damage embedding (step 330). It should be appreciated that the target damage embedding may represent zero damage in the case of a music restoration operation, or may represent varying levels of damage depending on the desired output, e.g., emulating or approximating music recordings of various time periods.

The generator processes the target damage vector and input music spectrogram to generate an output music spectrogram that has damage characteristics corresponding to the target damage vector (step 340). The output of the generated music spectrogram is input to a spectrogram inversion module, or phase reconstruction module, which reintroduces phase features into the generated music spectrogram (step 350). The resulting generated music waveform is then output for storage or audio output (step 360). The operation then terminates.

As is apparent from the above description, the illustrative embodiments may be utilized in many different types of data processing environments in which music or other audio recordings are utilized. For example, many online music services may wish to offer music recordings from time periods where the only available recordings exist on physical media that suffer from the damage problems discussed above. Hence, it would be desirable to implement the mechanisms of the illustrative embodiments to restore such music recordings to an undamaged, or at least minimally damaged, state so that the clean or restored versions of the music may be made available through the music service. In other illustrative embodiments, individual music recording owners may wish to utilize the mechanisms of the illustrative embodiments to restore the state of their own music collections to an undamaged or restored state for their own personal use. Various computing system users may wish to make use of the GAN based restoration system mechanisms of the illustrative embodiments to improve the quality of the music recordings that they own and/or provide.

Figure 4:
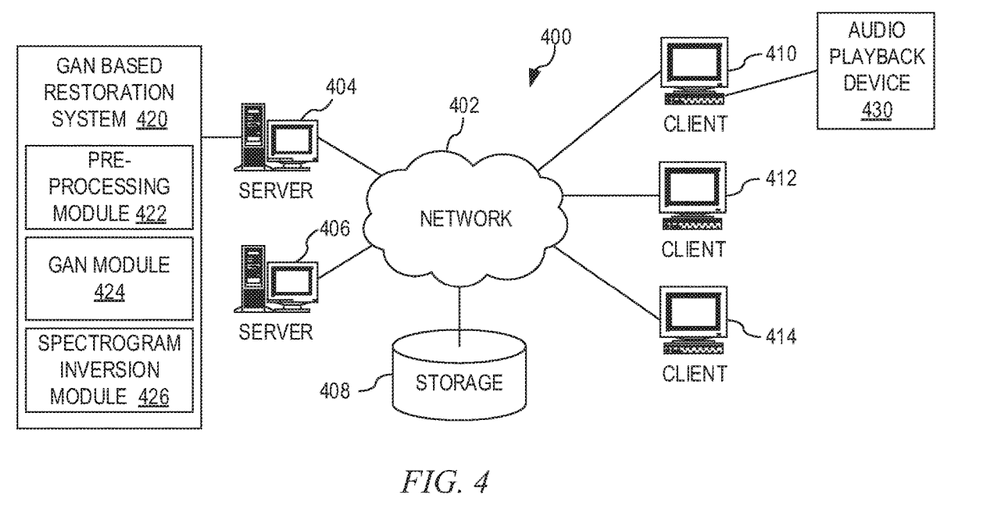
FIG. 4 is an example diagram of a distributed data processing system in which aspects of the illustrative embodiments may be implemented.
Figure 5:
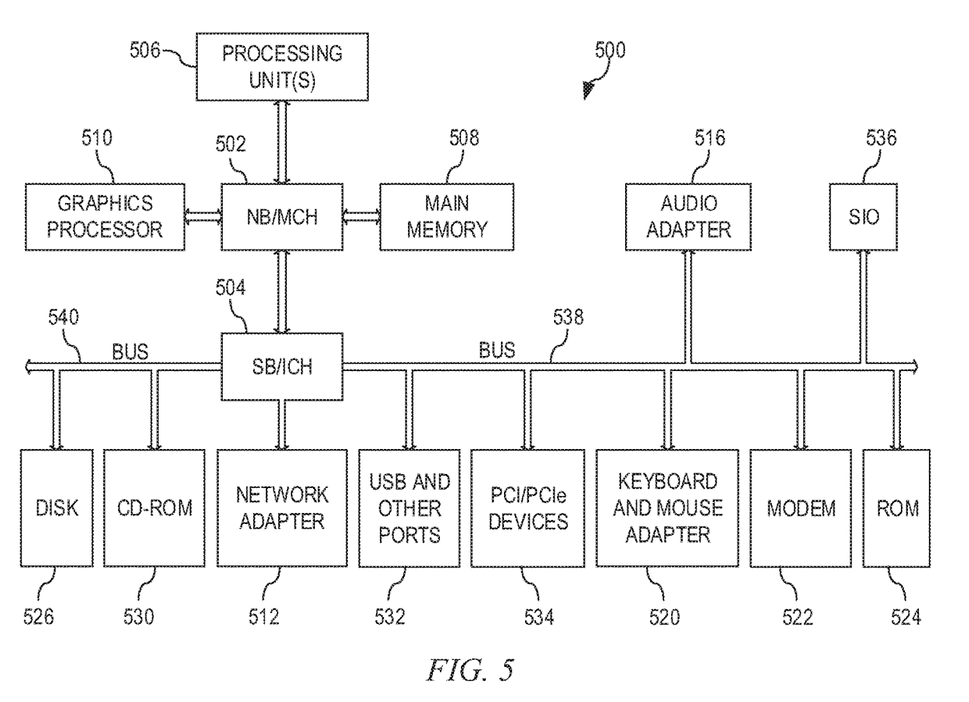
FIG. 5 is an example block diagram of a computing device in which aspects of the illustrative embodiments may be implemented.

In order to provide a context for the description of the specific elements and functionality of the illustrative embodiments, FIGS. 4 and 5 are provided hereafter as example environments in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and server 406 are connected to network 402 along with storage unit 408. In addition, clients 410, 412, and 414 are also connected to network 402. These clients 410, 412, and 414 may be, for example, personal computers, network computers, or the like. In the depicted example, server 404 provides data, such as boot files, operating system images, and applications to the clients 410, 412, and 414. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement a GAN based restoration system 420 comprising a pre-processing module 422, GAN module 424 comprising a damage encoder, generator, and discriminator, such as described above in FIG. 1 for example, and spectrogram inversion module 426. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates a new functionality performed by the computing device to perform restoration of audio recordings so as to remove or at least minimize the influences of physical damage to a medium on which the audio recording is recorded, on the quality of the audio recording itself, e.g., eliminate or minimize the effects of physical damage to grooves in a vinyl record music recording.

With the mechanisms of the illustrative embodiments, one or more of the client computing devices 410, 412, or 414, or even other servers 404, 406 may be associated with a physical audio playback device 430, such as a record player or the like, and may execute software or otherwise be provided with hardware/software for converting analog recordings of audio into a digital format through an analog to digital converter. Such mechanisms for converting analog audio to digital data structures is generally known in the art. The client or server computing device, e.g., client computing device 410, may obtain the digital version of the audio waveform and store it as an audio waveform data structure, e.g., music waveform data structure. In addition, the computing device, e.g., client computing device 410, may transmit the audio waveform data structure to the server 404, 406 that implements the GAN based restoration system 420 in order to perform the restoration operations described previously with regard to FIGS. 1-3. The GAN based restoration system 420 may receive the audio waveform data structure, generate an audio spectrogram using the pre-processing module 422, generate a restored audio spectrogram using the trained generator of the GAN module 424, and generate a restored audio waveform data structure based on the restored audio spectrogram. The restored audio waveform data structure may then be stored for later use and/or returned to the computing device from which the original audio waveform data structure was received, e.g., client computing device 410.

As noted above, the mechanisms of the illustrative embodiments utilize specifically configured computing devices, or data processing systems, to perform the operations for restoring audio recordings by utilizing a GAN based restoration system. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System p® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the GAN based restoration system.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

It should be appreciated that while the above embodiments have been described with regard to audio recordings, or music recordings, be provided on physical media such as vinyl records, the illustrative embodiments are applicable to any audio waveform inputs recorded in analog or digital formats on analog or digital recording media. For example, the audio recordings may be provided on other types of analog recording media, such as audio tapes, e.g., cassettes, 8-track tapes, reel-to-reel tapes, and the like. The audio recordings may also be present on digital recording media, such as compact discs, digital files in various memories or storage media, or the like.

Moreover, the mechanism of the illustrative embodiments may be applied to audio recordings that may be considered "clean" or "undamaged" in order to approximate music at a different level of damage, such as from a different time period, e.g., music recorded in 2019 may be processed by the mechanisms of the illustrative embodiments to render a modified music waveform approximating the same music content being recorded in 1965, for example. Thus, any audio recording on any analog or digital audio recording medium may be used as a source of an audio waveform input to the trained generator of the illustrative embodiments. Therefore, in some illustrative embodiments, the mechanisms of the illustrative embodiments may generate restored audio recordings by minimizing the level of damage present in the original audio recordings so as to make the original audio recording more "clean" or less damaged. In other illustrative embodiments, the mechanisms of the illustrative embodiments may generate retro audio recordings by increasing the level of damage present in the original audio recordings so as to make the original audio recordings appear more "vintage" or "retro" having more damage approximating physical damage to a recording medium and thereby approximating audio recordings of a given time period.

The illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to specifically configure the processor to implement a generative adversarial network (GAN) based restoration system, the method comprising:

training, by the GAN based restoration system, a first neural network of a generator of the GAN based restoration system, to generate an artificial audio spectrogram having a target damage characteristic based on an input audio spectrogram and a target damage vector, thereby generating a trained generator;

inputting, by the GAN based restoration system to the trained generator, an original audio recording spectrogram corresponding to an original audio recording and an input target damage vector;

processing, by the trained generator, the original audio recording spectrogram to generate an artificial audio recording spectrogram having a level of damage corresponding to the input target damage vector; and converting, by a spectrogram inversion module of the GAN based restoration system, the artificial audio recording spectrogram to an artificial audio recording waveform output.

2. The method of claim 1, wherein the method further comprises:

training, by the GAN based restoration system, a second neural network of a discriminator of the GAN based restoration system, to discriminate between artificial audio spectrograms and true audio spectrograms, and thereby generate a trained discriminator.

3. The method of claim 2, wherein training the first neural network comprises training the first neural network to generate an artificial audio spectrogram that causes the trained discriminator to misclassify the artificial audio spectrogram to be a true audio spectrogram.

4. The method of claim 2, wherein training the second neural network comprises iteratively training the second neural network to minimize a discriminator adversarial loss that represents the degree to which the discriminator can correctly recognize an input audio spectrogram as artificial, and wherein training the first neural network comprises iteratively training the first neural network to minimize a combination of both a generator adversarial loss that represents the degree to which the discriminator can recognize the artificial audio spectrogram output generated by the generator as artificial, and an identity loss that represents a self-to-self conversion to self.

5. The method of claim 1, wherein inputting the original audio recording spectrogram comprises processing, by a pre-processing module of the GAN based restoration system, an original audio waveform data structure representing the original audio recording comprising audio imperfections due to physical damage to a medium on which the original audio recording is recorded, to generate the original audio spectrogram and the input target damage vector based on the audio imperfections.

6. The method of claim 5, wherein the input target damage vector specifies one or more damage characteristics that represent an amount of physical damage to a target medium different from the physical damage to the medium on which the original audio recording is recorded.

7. The method of claim 1, wherein the input target damage vector is generated by a damage encoder of the GAN based restoration system, based on an input date label, wherein the damage encoder is trained to correlate a date label with a damage embedding represented as the input target damage vector.

8. The method of claim 1, wherein converting the artificial audio recording spectrogram to the artificial audio recording waveform output comprises introducing, by the spectrogram inversion module, a phase into the artificial audio spectrogram to thereby generate the artificial audio waveform data structure.

9. The method of claim 1, wherein the input target damage vector corresponds to a target damage level of a restored audio recording having a level of damage less than the original audio recording has, and the method further comprises outputting, by the GAN based restoration system, the artificial audio waveform data structure as a restored version of the original audio recording to one of a storage system for later playback, or to an audio output device for output as an audio output.

10. The method of claim 1, wherein the input target damage vector corresponds to a target damage level of a retro audio recording having a level of damage greater than the original audio recording has, and the method further comprises outputting, by the GAN based restoration system, the artificial audio waveform data structure as a retro version of the original audio recording to one of a storage system for later playback, or to an audio output device for output as an audio output.

11. A computer program product comprising a computer readable storage medium having a computer readable program stored therein, wherein the computer readable program, when executed on a computing device, causes the computing device to implement a generative adversarial network (GAN) based restoration system that operates to:

train a first neural network, of a generator of the GAN based restoration system, to generate an artificial audio spectrogram having a target damage characteristic based on an input audio spectrogram and a target damage vector, thereby generating a trained generator;

input, to the trained generator, an original audio recording spectrogram corresponding to an original audio recording and an input target damage vector;

process, by the trained generator, the original audio recording spectrogram to generate an artificial audio recording spectrogram having a level of damage corresponding to the input target damage vector; and convert, by a spectrogram inversion module of the GAN based restoration system, the artificial audio recording spectrogram to an artificial audio recording waveform output.

12. The computer program product of claim 11, wherein the computer readable program further causes the GAN based restoration system to:

train a second neural network of a discriminator, of the GAN based restoration system, to discriminate between artificial audio spectrograms and true audio spectrograms, and thereby generate a trained discriminator.

13. The computer program product of claim 12, wherein training the first neural network of the generator comprises training the first neural network to generate an artificial audio spectrogram that causes the trained discriminator to misclassify the artificial audio spectrogram to be a true audio spectrogram.

14. The computer program product of claim 12, wherein training the second neural network comprises iteratively training the second neural network to minimize a discriminator adversarial loss that represents the degree to which the discriminator can correctly recognize an input audio spectrogram as artificial, and wherein training the first neural network comprises iteratively training the first neural network to minimize a combination of both a generator adversarial loss that represents the degree to which the discriminator can recognize the artificial audio spectrogram output generated by the generator as artificial, and an identity loss that represents a self-to-self conversion to self.

15. The computer program product of claim 11, wherein inputting the original audio recording spectrogram comprises processing, by a pre-processing module of the GAN based restoration system, an original audio waveform data structure representing the original audio recording comprising audio imperfections due to physical damage to a medium on which the original audio recording is recorded, to generate the original audio spectrogram and the input target damage vector based on the audio imperfections.

16. The computer program product of claim 15, wherein the input target damage vector specifies one or more damage characteristics that represent an amount of physical damage to a target medium different from the physical damage to the medium on which the original audio recording is recorded.

17. The computer program product of claim 11, wherein the input target damage vector is generated by a damage encoder of the GAN based restoration system, based on an input date label, wherein the damage encoder is trained to correlate a date label with a damage embedding represented as the input target damage vector.

18. The computer program product of claim 11, wherein converting the artificial audio recording spectrogram to the artificial audio recording waveform output comprises introducing, by the spectrogram inversion module, a phase into the artificial audio spectrogram to thereby generate the artificial audio waveform data structure.

19. The computer program product of claim 11, wherein the input target damage vector corresponds to a target damage level of a restored audio recording having a level of damage less than the original audio recording has, and the computer readable program further causes the GAN based restoration system to output the artificial audio waveform data structure as a restored version of the original audio recording to one of a storage system for later playback, or to an audio output device for output as an audio output.

20. An apparatus comprising:
a processor; and
a memory coupled to the processor, wherein the memory comprises instructions which, when executed by the processor, causes the processor to implement a generative adversarial network (GAN) based restoration system that operates to:
train a first neural network, of a generator of the GAN based restoration system, to generate an artificial audio spectrogram having a target damage characteristic based on an input audio spectrogram and a target damage vector, thereby generating a trained generator;
input, to the trained generator, an original audio recording spectrogram corresponding to an original audio recording and an input target damage vector;
process, by the trained generator, the original audio recording spectrogram to generate an artificial audio recording spectrogram having a level of damage corresponding to the input target damage vector; and
convert, by a spectrogram inversion module of the GAN based restoration system, the artificial audio recording spectrogram to an artificial audio recording waveform output.

* * * * *